(12) United States Patent
Rexer et al.

(10) Patent No.: US 8,368,538 B2
(45) Date of Patent: Feb. 5, 2013

(54) METHOD OF MAKING AN RFID LABEL

(75) Inventors: Juergen Rexer, Holzmaden (DE); Martin Bohn, Reutlingen (DE)

(73) Assignee: bielomatik Leuze GmbH + Co.KG, Neuffen (DE)

( * ) Notice: Subject to any disclaimer, the term of this patent is extended or adjusted under 35 U.S.C. 154(b) by 490 days.

(21) Appl. No.: 12/593,947

(22) PCT Filed: Aug. 1, 2008

(86) PCT No.: PCT/EP2008/006343
§ 371 (c)(1),
(2), (4) Date: Sep. 30, 2009

(87) PCT Pub. No.: WO2009/030325
PCT Pub. Date: Mar. 12, 2009

(65) Prior Publication Data
US 2010/0134294 A1 Jun. 3, 2010

(30) Foreign Application Priority Data
Sep. 4, 2007 (DE) .......................... 10 2007 041 751

(51) Int. Cl.
*G08B 13/14* (2006.01)

(52) U.S. Cl. ................ 340/572.1; 340/572.4; 340/572.8; 340/5.6; 340/10.1; 340/10.4; 235/485; 235/487; 235/492; 235/494

(58) Field of Classification Search ............... 340/572.1, 340/572.4, 572.8, 5.6, 10.1, 10.44, 10.4; 235/487, 492, 494
See application file for complete search history.

(56) References Cited

U.S. PATENT DOCUMENTS

| | | | |
|---|---|---|---|
| 5,528,222 A * | 6/1996 | Moskowitz et al. | 340/572.7 |
| 6,459,588 B1 * | 10/2002 | Morizumi et al. | 361/737 |
| 6,569,508 B2 * | 5/2003 | Babb et al. | 428/40.1 |
| 7,557,715 B1 * | 7/2009 | Noakes et al. | 340/572.8 |
| 2006/0000915 A1 | 1/2006 | Kodukula | 235/492 |
| 2006/0012482 A1 | 1/2006 | Zalud | 340/572.7 |
| 2006/0043198 A1 | 3/2006 | Forster | 235/492 |
| 2006/0044769 A1 | 3/2006 | Forster | 361/760 |
| 2006/0055541 A1 | 3/2006 | Bleckmann | 340/572.7 |
| 2007/0052613 A1 | 3/2007 | Gallschuetz | 343/860 |
| 2008/0295318 A1 | 12/2008 | Bohn | 29/601 |

FOREIGN PATENT DOCUMENTS

| | | |
|---|---|---|
| DE | 19820234 | 11/1999 |
| DE | 102007026672 | 12/2008 |
| WO | WO 2008055578 | 5/2008 |
| WO | WO 2008055579 | 5/2008 |
| WO | WO 2008148527 | 12/2008 |

OTHER PUBLICATIONS

"A Guide to Real-World RFID Converting" Avery Dennison Corp.; 2007.

* cited by examiner

*Primary Examiner* — Tai T Nguyen
(74) *Attorney, Agent, or Firm* — Andrew Wilford

(57) ABSTRACT

The invention relates to method for producing an RFID label. According to said method, a coupling antenna (2) arranged on a web-shaped support material (1) comprising an RFID chip (4) arranged thereon is glued onto a secondary antenna (10). The aim of the invention is to provide an RFID label that can be produced from few recyclable materials with little complication and in an environmentally friendly manner. The invention is characterized in that first the coupling antenna (2) comprising the chip (4) is glued onto a self-adhesive secondary antenna (10) in one step, the secondary antenna having a backing adhesive layer (12).

6 Claims, 4 Drawing Sheets

METHOD OF MAKING AN RFID LABEL

CROSS REFERENCE TO RELATED APPLICATIONS

This application is the US-national stage of PCT application PCT/EP2008/006343, filed 1 Aug. 2008, published 12 Mar. 2009 as WO2009/030325, and claiming the priority of German patent application 102007041751.0 itself filed 4 Sep. 2007, whose entire disclosures are herewith incorporated by reference.

FIELD OF THE INVENTION

The invention relates to a method of and an apparatus for making an RFID label as well as an RFID label made according to the method.

BACKGROUND OF THE INVENTION

Self-adhesive RFID labels are known that have a printable face strip or sheet having a back face provided with a layer of pressure-sensitive adhesive. The pressure-sensitive adhesive layer of the face strip is covered by a backing strip that can be removed to adhere the label. An RFID inlay is provided between the face strip and the backing strip, which RFID inlay comprises an inlay strip or sheet having a back face provided with a layer of pressure-sensitive adhesive, and on a front face of which an RFID chip and an RFID antenna are mounted. The front face of the RFID inlay is firmly adhered to the pressure-sensitive adhesive layer of the face strip. An RFID label of this type and a method for the production thereof are described in WO 2005/076206 [US 2008/0295318].

German patent application 10 2006 052 516 [WO 2008/055578] describes a self-adhesive RFID label and a method for making same, in which the same material is used for the inlay strip of the RFID inlay, including the pressure-sensitive adhesive layer thereof, as for the face strip of the label.

German application 10 2006 052 517 [WO 2008/055579] describes a chip module for an RFID label in which an RFID chip and a coupling antenna electrically connected to the RFID chip are provided on a backing strip or sheet. To produce an RFID inlay for an RFID label, the chip module is adhered with its back-face film onto a flat RFID antenna, positioned such that the coupling antenna and the RFID antenna are inductively coupled.

In German application 10 2007 026 672 a self-adhesive antenna for an RFID system, in particular for an RFID label, is described, that is punched out of an aluminum foil with a thickness of 1 μm-20 μm and adhered to an adhesive-coated front face of a backing strip.

OBJECT OF THE INVENTION

The object of the invention is to provide a method of and an apparatus for making self-adhesive RFID labels in a simplified manner.

SUMMARY OF THE INVENTION

These objects are attained in that first the coupling antenna with the chip is adhered in one step to a self-adhesive secondary antenna having a back face provided with an adhesive layer.

BRIEF DESCRIPTION OF THE DRAWING

The invention is described in more detail below with reference to the accompanying drawing in which.

SPECIFIC DESCRIPTION

Figure 1:
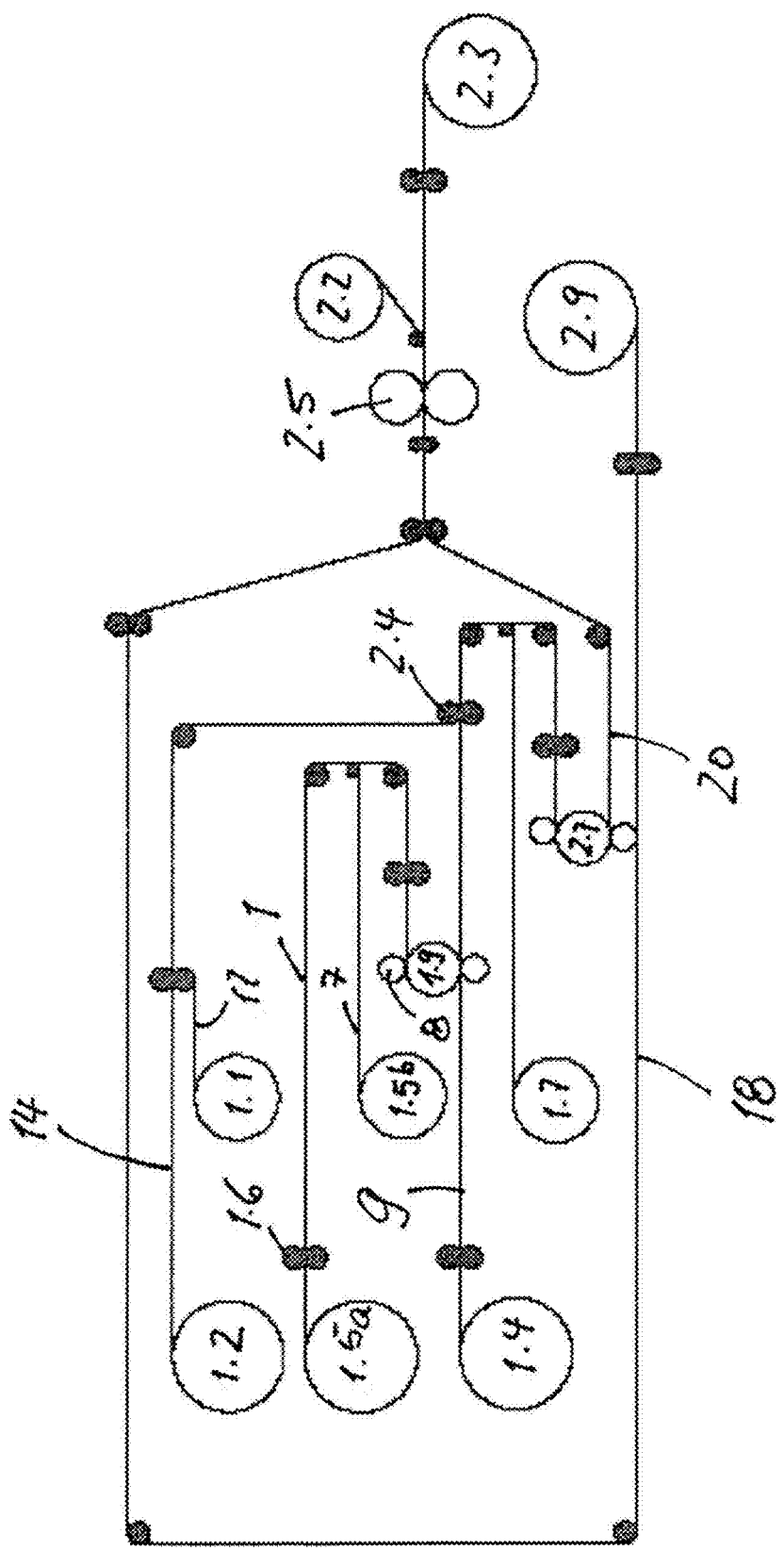
FIG. 1 shows a production method for an RFID label in which a secondary antenna punched out of aluminum foil is used.

With the method according to FIG. 1, a backing strip 1 is unwound in a station 1.5a with a coupling antenna 2 firmly adhered to its front face by an adhesive layer 3. An RFID chip 4 is mounted on the coupling antenna 2 and is galvanically coupled to it. An adhesive layer 5 on the back face of the backing strip 1 is covered by a removable release strip 7. Preferably, the backing strip 1 is of paper and the release strip 7 of a silicone paper.

In the embodiment of FIG. 1, the coupling antennas 2 can also be carried on a backing strip of polyester or printed on the backing strip with an aluminous paint.

After unwinding of the coupling antenna laminate in the station 1.5a, first the release strip 7 of silicone paper is stripped off and wound up in a station 1.5b. In the embodiment according to FIG. 1, what is left of the coupling antenna laminate is fed to a station 1.9 having a vacuum roller on which a knife cylinder 8 is mounted to die-cut the coupling antennas 2 as required.

Figure 4:
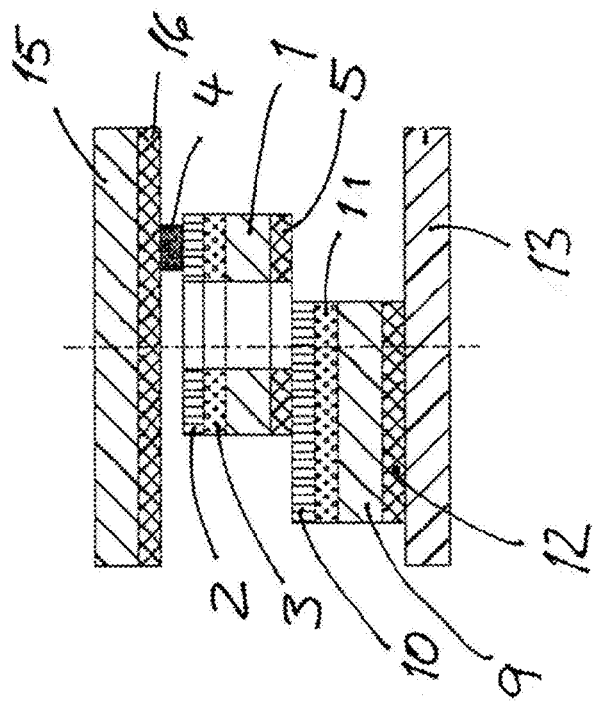
FIG. 4 is a section through the label according to FIG. 3
Figure 3:
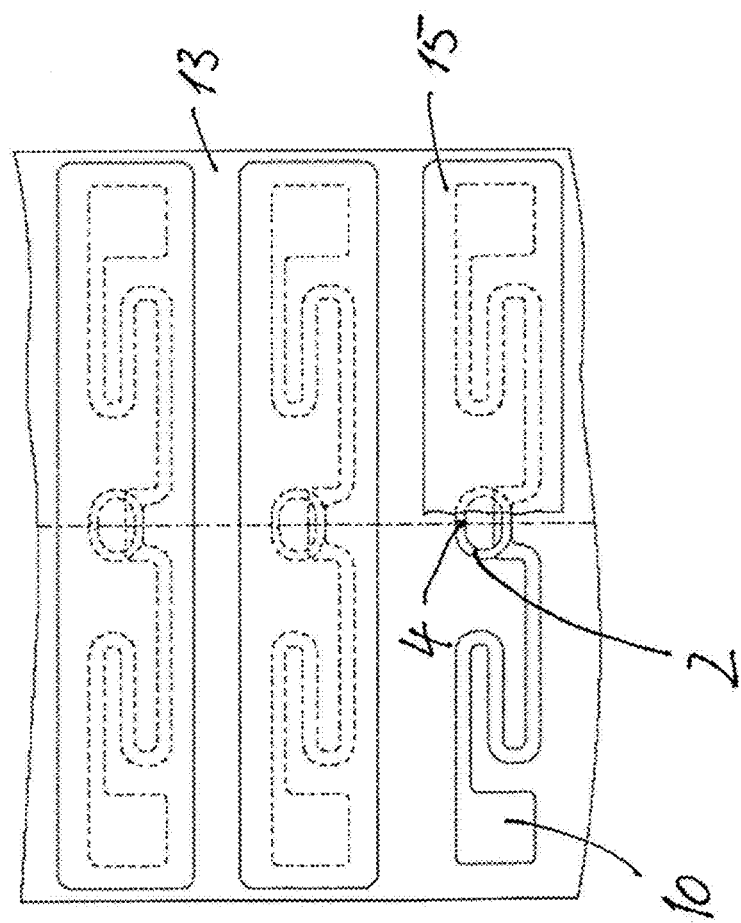
FIG. 3 shows a so-called on-pitch RFID label.

An antenna film 9 in a station 1.4 has a front face on which secondary antennas 10 are firmly secured at regular intervals by an adhesive layer 11. The antenna film 9 has on its back face an adhesive layer 12 that is covered by a removable release strip 13, preferably of silicone paper. In the station 1.9 a respective coupling antenna 2 with its chip 4 separated by the cutter 8 is adhered to each secondary antenna 10. If the spacing in the travel direction of the coupling antennas 2 with their chips 4 and the spacing in the travel direction of the secondary antennas 10 is identical, the coupling antenna 2 with the chip 4 can also be adhered to the "on-pitch" secondary antenna 10 continuously without separation by the cutting roller 8. This forms a self-adhesive UHF inlay that can be further processed. The self-adhesive secondary antennas 10 fed from the station 1.4 were produced by etching, printing or punching. The self-adhesive secondary antennas 10 described in German patent application 10 2007 026 720 are preferably used, punched out of an aluminum foil of a thickness of 1 μm-20 μm, preferably about 10 μm, and adhered to the outer face of the adhesive [antenna] strip 9. The adhesive [antenna] film having a back face provided the pressure-sensitive adhesive layer 12 is covered by the removable release strip 13. When these so-called aluminum/adhesive antennas are unwound in the station 1.4, a bonding stock 14 is unwound in a station 1.2 and is laminated downstream of the station 1.9 in another station 2.4 onto the antenna strip 9 to which the punched-out secondary antennas 10 and respective chip modules of the coupling antennas 2 are already adhered. The bonding stock 14 comprises a face strip 15 of paper whose back face carries an adhesive layer 16 that is uncovered by a backing strip 17 of silicone paper when unwound from the roller in the station 1.2. Before lamination, the release strip 17 is separated and rolled up to form a roll in a station 1.1. After lamination of the face strip 15, a self-adhesive continuous UHF inlay is produced that has all of the components necessary for an RFID label. It can be fed directly to a punching station 2.5 where the face strip 15 is punched out into individual sections so that a row of removable, self-adhesive RFID labels spaced one after the other is produced on the continuous release strip 13, which RFID labels are shown in FIGS. 3 and 4. The blanking skeleton accumulating as waste during punching is wound up to form a roll in a station 2.2. The releasable release strip 13 with the self-adhesive labels spaced thereon is wound up to form a roll as the end product in a station 2.3.

Figure 6:
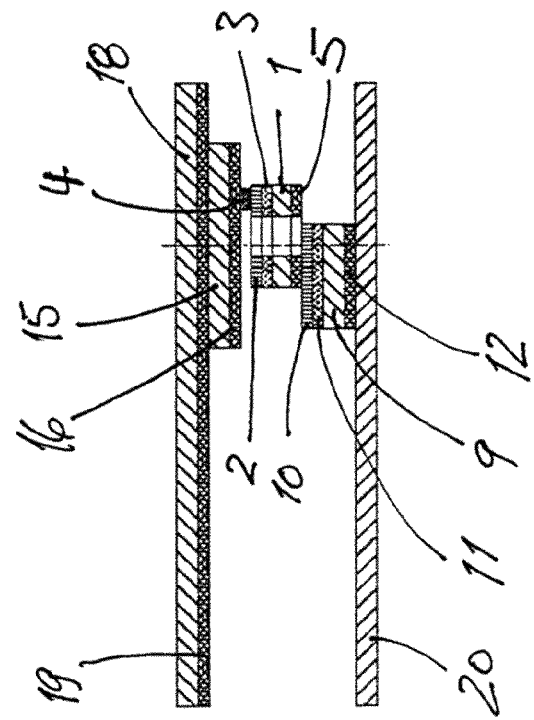
FIG. 6 is a section through the label according to FIG. 5.
Figure 5:
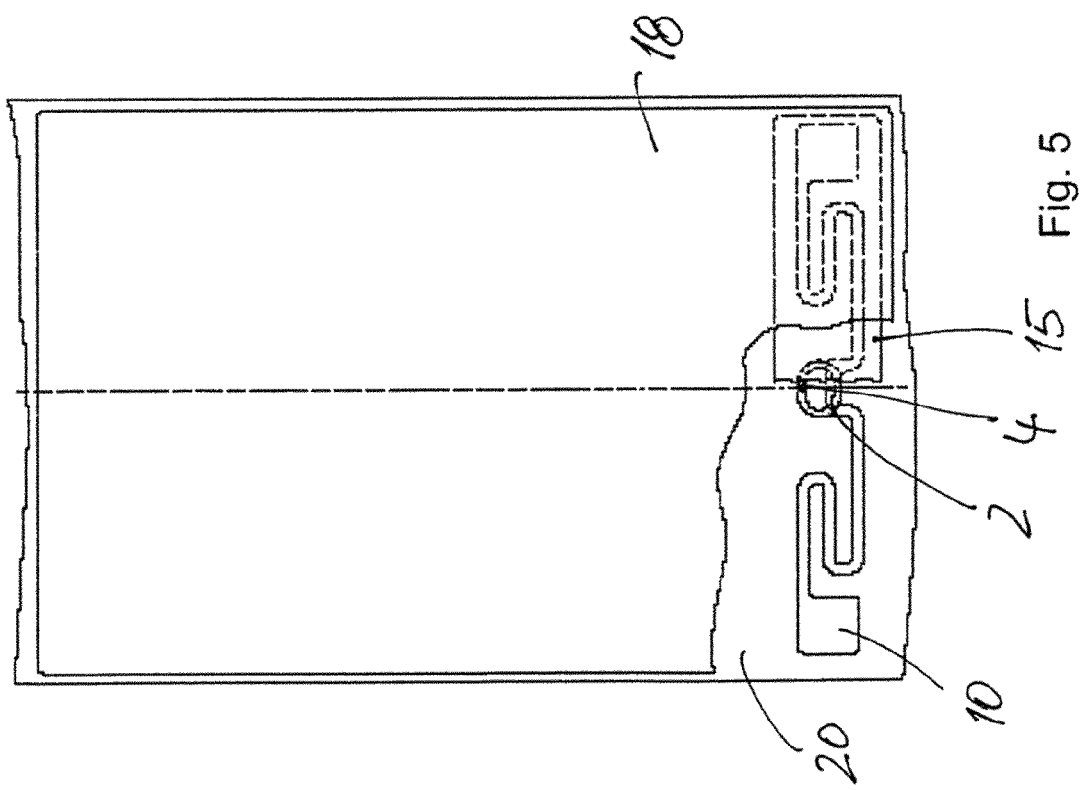
FIG. 5 shows a so-called off-pitch RFID label.

If an off-pitch RFID label is produced, as shown in FIGS. 5 and 6, the self-adhesive RFID inlay is dispensed in a larger label format. To this end, label stock comprising a printable face strip 18 of paper having a back face carrying an adhesive layer 19 in turn covered by a release strip 20 of silicone paper is unrolled from a supply roll in a station 2.9. The face strip 18 with the adhesive layer 19 is first separated from the release strip 20 in a station 2.7. While the face strip 18 is moved through a large loop, in the station 2.7 the individual RFID inlays are adhered to the release strip 20 such that one RFID inlay is adhered for each label, depending on the label length. The release strip 20 with the inlays is subsequently connected to the face strip 18 again immediately upstream of the station 2.5. A relamination of the label stock is carried out. Subsequently, the individual labels are punched out in the station 2.5, the silicone paper remaining continuous and the blanking skeleton removed is wound up to form a roll in the station 2.2. The continuous silicone paper 20 with the RFID self-adhesive labels adhering thereto is subsequently wound up to form a roll in the station 2.3. Beforehand, each punched out RFID label is checked for correct function by an HF or UHF reader and possibly marked or printed, for example by an inkjet printer.

Figure 2:
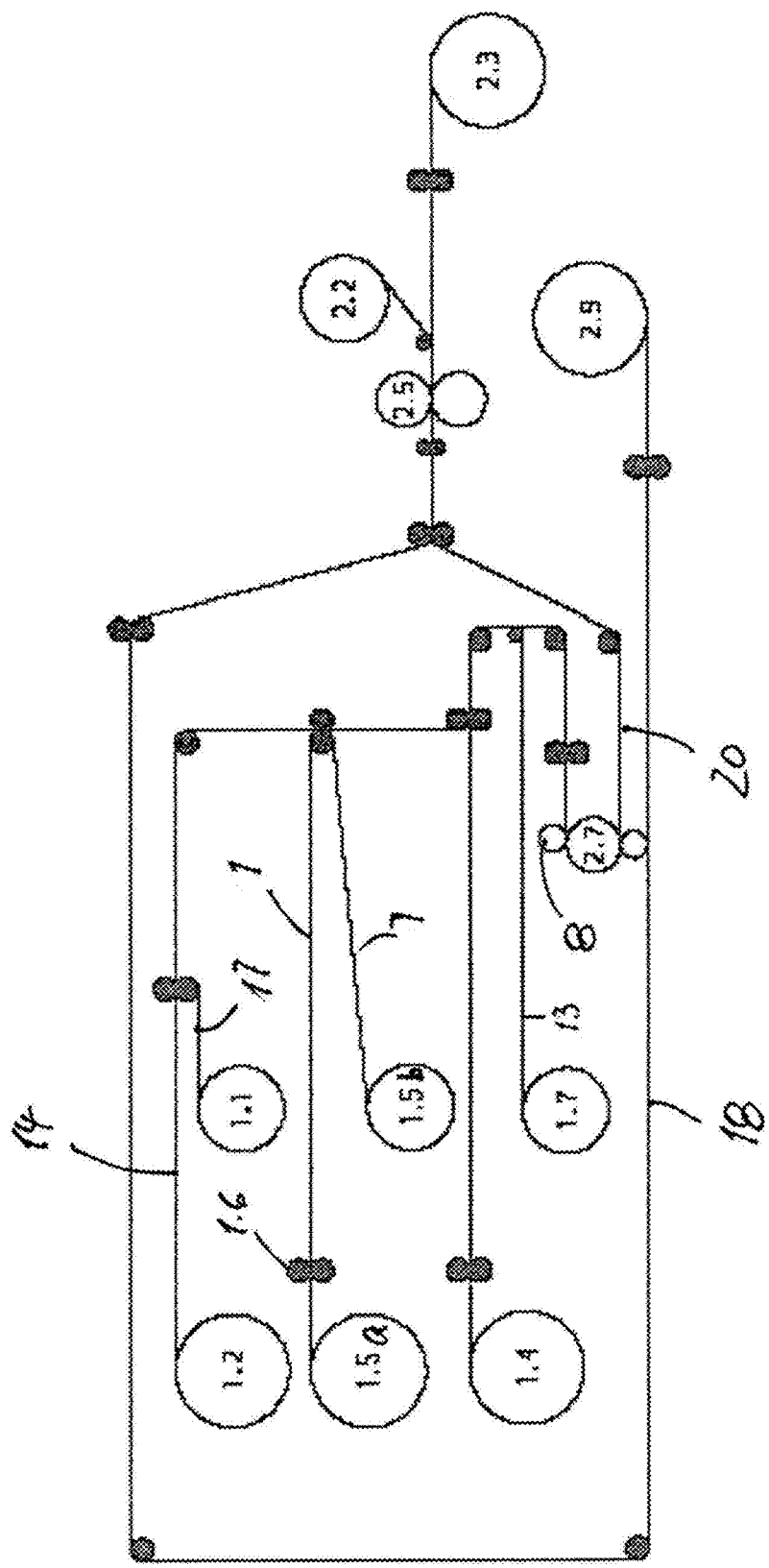
FIG. 2 shows a method in which a coupling antenna of an aluminum/adhesive laminate strip is used.

In the method according to FIG. 2, the coupling antennas are manufactured from a starting stock made of an aluminum/adhesive laminate strip comprised of a backing strip 1 whose front face carries coupling antennas 2 punched out of thin aluminum foil of 1 µm-20 µm, preferably about 10 µm, thickness, with respective RFID chips 4 electrically coupled thereto. The back face of the backing strip 1, which is preferably composed of paper, carries an adhesive layer 5 covered by a release strip 7 of silicone paper. The aluminum/adhesive laminate is unwound from a roll by feed rollers in the station 1.5a and fed to the bonding stock 14 unwound in the station 1.2. The coupling antennas 2 are adhered to the back face of the face strip 15, after the silicone release strip 17 of the bonding stock 14 has been removed and rolled up in the station 1.1. At the same time, the release strip 7 is removed from the aluminum/adhesive laminate of the coupling antennas 2 and rolled up to form a roll in the station 1.5b. The adhesive layer 5 thus exposed on the back face of the coupling antennas 2 is then pressed against the on-pitch antenna strip 9 such that the secondary antenna 10 adheres firmly to the back face of the face strip 15 with the adhesive layer 16 and the adhesive layer 5 of the coupling antenna 2 and an inductive connection with the coupling antenna 2 and the secondary antenna 10 is thus produced. Subsequently, the release strip 13 of the antenna strip 9 is removed and wound up to form a roll in the station 1.7. The division into individual RFID labels and the transfer to the silicone carrier 20 of the label stock in the station 2.7 is subsequently carried out in the manner described in connection with the method according to FIG. 1. The same applies to the subsequent relamination, the punching out of the individual labels in the station 2.5, the checking of the functionality and the winding up of the end product to form a roll in the station 2.3.

Preferably, all of the backing strips of the finished label are composed of paper and all of the antennas are made of aluminum. This renders possible a cost-cutting and environmentally friendly production, since these materials are recyclable and a minimal number of materials are used.

Furthermore, it is advantageous if all of the adhesive layers exposed after the removal of the label from the silicone paper foil 18 are produced from the same adhesive. In the illustrated embodiments according to FIGS. 4 and 6, these are the adhesive layers 12, 5, 16 and 19, which are exposed at least in part when the label is adhered to a product. In the case of the finished RFID label, there is thus a continuous pressure-sensitive adhesive layer of one pressure-sensitive adhesive. This rules out the possibility that faults could occur during the adhesion of the label that could be caused by use of a different adhesive for the RFID inlay. If all the carrier layers are made of paper, no special inlay stock is needed for the RFID inlay. A portion of the label stock can be separated for the inlay. This applies to the entire inlay stock, including the backing strips for the coupling antenna and the secondary antenna.

The invention claimed is:

1. A method of making an RFID label, the method comprising:
   providing a coupling antenna with a respective RFID chip on a front face of a backing strip having a back face carrying a layer of pressure-sensitive adhesive;
   providing a secondary antenna anchored to a front face of an antenna strip; and
   pressing the secondary antenna directly against the adhesive layer on the back face of the backing strip to bond the secondary antenna to the antenna strip adjacent the coupling antenna and form a laminated inlay comprised of the backing strip with its coupling antenna and RFID chip, the secondary antenna, and the antenna strip.

2. The method defined in claim 1, further comprising the steps of:
   providing a strippable release strip on the adhesive layer on the back face of the backing strip; and
   stripping the release strip off the back face of the backing strip to uncover the adhesive layer on the back face of the backing strip before pressing the secondary antenna against the adhesive layer on the back face of the backing strip.

3. The method defined in claim 2, further comprising the steps of:
   providing a first face strip with a back face provided with a layer of pressure-sensitive adhesive; and
   providing a first strippable release strip on the adhesive layer on the back face of the first face strip.

4. The method defined in claim 3, further comprising the steps of:
   stripping the first release strip off the back face of the first face strip to uncover the adhesive layer on the back face of the first face strip and thereafter;
   pressing the coupling antenna and RFID chip against the uncovered adhesive layer on the back face of the first face strip.

5. The method defined in claim 3, further comprising the steps of:
   providing a pressure-sensitive adhesive layer on a back face of the antenna strip; and
   adhering a first strippable release strip to the adhesive layer on the back face of the antenna strip.

6. The method defined in claim 5, further comprising the steps of sequentially:
   providing a second face strip having a back face provided with an adhesive layer;
   providing a second strippable release strip on the adhesive layer on the back face of the second face strip;

stripping the second release strip off the adhesive layer on the back face of the second face strip;
after stripping the first release strip off the adhesive layer on the back face of the of the antenna strip,
pressing the second release strip against the adhesive layer on the back face of the antenna strip; and
pressing the adhesive layer against a front face of the first face strip; and relaminating together the second release strip and the second face strip with the first face strip, coupling antenna, RFID chip, backing strip, secondary antenna, and antenna strip between them.

\* \* \* \* \*